United States Patent [19]

Tokunaga et al.

[11] 4,315,643

[45] Feb. 16, 1982

[54] HEAT-SENSITIVE TRANSFER ELEMENT

[75] Inventors: Yukio Tokunaga, Yokosuka; Kiyoshi Sugiyama, Zushi; Tadao Seto, Matsudo, all of Japan

[73] Assignees: Nippon Telegraph & Telephone Public Corp., Tokyo; Fuji Kagakushi Kogyo Co., Ltd., Osaka, both of Japan

[21] Appl. No.: 152,769

[22] Filed: May 23, 1980

[30] Foreign Application Priority Data

Nov. 26, 1979 [JP] Japan ................................ 54-153506

[51] Int. Cl.[3] ........................... B41L 1/20; B32B 7/02; B32B 9/06

[52] U.S. Cl. .................................... 282/27.5; 427/148; 427/150; 427/151; 427/152; 427/153; 427/261; 428/213; 428/218; 428/332; 428/337; 428/341; 428/342; 428/484; 428/488; 428/537; 428/913

[58] Field of Search ............... 428/206, 207, 218, 332, 428/337, 341, 342, 913, 101, 213, 484, 488, 537; 427/148, 150, 152, 261, 151, 153; 282/27.5

[56] References Cited

U.S. PATENT DOCUMENTS 3,983,279 9/1976 Matsushita et al. ................. 428/101

*Primary Examiner*—Thomas J. Herbert, Jr.
*Attorney, Agent, or Firm*—Armstrong, Nikaido, Marmelstein & Kubovcik

[57] ABSTRACT

A heat-sensitive transfer element comprising a foundation, a thermal color-developing layer provided on the front surface of the foundation and a hot-melt ink layer provided on the back surface of the foundation; the ink layer including a heat conductive material powder and a solid wax, and having a melt-transfer property a printed image to be formed on the thermal color-developing layer by the impression of a thermal head, and simultaneously the hot-melt ink being transferred to a copy sheet facing the transfer element at the hot-melt ink layer side, the duplicated image having good clarity and excellent durability being able to be prepared at a high speed on a thermal printer.

7 Claims, 3 Drawing Figures

HEAT-SENSITIVE TRANSFER ELEMENT

BACKGROUND OF THE INVENTION

The present invention relates to a novel heat-sensitive transfer element being preferably employed to a thermal printing device such as a thermal printer or the like.

Recently, as a printing method using the thermal printing device, the method which comprises overlapping two sheets of thermal paper and forming printed images of the same pattern to each color-developing surface of both thermal papers by Joule's heat generated from a thermal printing head has been proposed.

Such a printing method has various drawbacks as mentioned below.

Firstly, according to the above method, it is impossible to print onto a conventional paper.

Secondly, since the large amount of Joule's heat is required to develop color by heating, a pulse must be conventionally impressed at the pulse width more than 15/1000 seconds in order to obtain a sharp and clear printed image, whereby the printed speed must be carried out at a rate of about 30 characters per second.

Thirdly, the printed image formed onto each color-developing surface of the upper and lower thermal papers is inferior in durability, and is easily alterable.

Fourthly, in order to duplicate the sharp and clear printed image on the lower thermal paper, two sheets of the thermal paper must be closely contacted to each other.

OBJECTS OF THE INVENTION

The main object of the present invention is to provide a novel heat-sensitive transfer element which can duplicate onto a conventional paper at a high printed speed.

Another object of the present invention is to provide a novel heat-sensitive transfer element in which the duplicated image formed on a conventional paper is superior in durability and has resistance against alteration of the duplicated image.

Other objects and advantages of the invention will become more apparent from the following descriptions and drawings.

DETAILED EXPLANATION OF THE INVENTION

It has now been found that the above-mentioned objects can be attained by a novel heat-sensitive transfer element.

Figure 1:
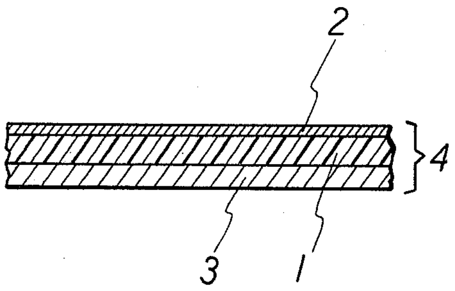
FIG. 1 is a perspective enlarged sectional view partially showing an embodiment of a heat-sensitive transfer element of the present invention.

As shown in FIG. 1, the heat-sensitive transfer element of the present invention comprises a foundation 1 in which the back surface has a Bekk smoothness of 60 to 2000 seconds, a thermal color-developing layer 2 provided on the front surface of the foundation 1, and a hot-melt ink layer 3 having the heat-sensitive transfer property, provided on the back surface of the foundation 1. The hot-melt ink layer 3 essentially includes a heat-conductive material powder such as black color pigment, metal powder pigment or the like, which has a heat conductivity of $6.0\times10^{-4}$ to $25.0\times10^{-4}$ cal./sec. cm. °C., and a solid wax having a penetration of 10 to 30 at 25° C., and has a viscosity of 20 to 200 cP at 100° C. by a Brookfield type viscometer.

The foundation 1 employed, according to the present invention, has at the back surface thereof a Bekk smoothness JIS P 8119 of 60 to 20000 seconds, more preferably 200 to 16000 seconds. Such a foundation 1 is a paper, such as glassine paper, tissue paper, electrical insulating paper, parchment paper, India paper, raw stock for paraffin paper or the like, having a thickness of 20 to 60μ, more preferably 30 to 50μ, and a density of 0.75 to 1.3 g./cm.$^3$, more preferably 0.8 to 1.2 g./cm.$^3$.

When the Bekk smoothness of the back surface of foundation 1 is less than the above range, its smoothness is inferior and the roughness reduces its adhesiveness with the hot melt ink layer 3, whereby the heat conductivity of foundation 1 for melting the above ink layer 3 becomes inferior, and results in irregular melt-transfer of the ink layer 3 to the copy sheet 5. On the other hand, when the Bekk smoothness of the back surface of foundation 1 is more than the above range, although the melt-transferability of the ink layer 3 is increased, it causes easy release of ink layer 3 during the printing or on storage, and can hamper obtaining the uniform duplicated image 12. In such cases, in order to prevent the release of the ink layer 3, various resinous materials as a softener having adhesiveness are added to the ink layer 3.

Further, when the thickness of the foundation 1 is less than the above range, the hot-melt ink penetrates through foundation 1 to the surface, thereby reducing the whiteness of the surface as well as the thermal head 7 being smudged by the exuded hot melt ink. On the other hand, when the thickness of the foundation 1 is more than the above range, a duplicated image 12 obtained is inferior in resolution due to the spread of the heat, and results in the absence of a sharp profile. In addition, when the density of the foundation 1 is less than the above range, the foundation 1 is inferior in heat conductivity due to the roughness of the surface thereof. On the other hand, when the density of the foundation 1 is more than the above range, the surface is tightly packed and has increased heat capacity that large electric power is necessary to melt and transfer the hot-melt ink layer 3.

The hot-melt ink layer 3 has a coating weight of 1 to 15 g./cm.$^2$, more preferably 3 to 10 g./cm.$^2$, and is prepared by means of the hot-melt coating of a composition which comprises the heat-conductive material, a coloring material, a binder material and the softener, or by means of the solvent coating of a liquid obtained by suspending the above composition in a suitable solvent.

When the coating weight of the hot-melt layer 3 is less than the above range, the amount of ink transferred by one impression is so little that a faint duplicated image 12 is obtained. On the other hand, when the coating weight of the hot-melt layer 3 is more than the above range, it causes the duplicated image 12 to spread, and reduces sharpness.

In addition, the hot-melt ink layer 3 has a heat conductivity of $4\times10^{-4}$ to $15\times10^{-4}$ cal./cm. sec.° C., more preferably $5\times10^{-4}$ to $9\times10^{-4}$ cal./cm. sec. °C. When the heat conductivity of the ink layer 3 is less than the above range, due to the momentary heating in one impression, a large amount of heat energy is required for securing the melt-transfer of the hot-melt ink layer 3. On the other hand, when the heat conductivity of the ink layer 3 is more than the above range, although the use is not limited, the production is difficult, and is not practical.

Thus, the preferred heat conductive material employed, according to the present invention, is the black color pigment such as acetylene black, lamp black, graphite, aniline black, KETJEN black (registered trademark of LION AKZO COMPANY LIMITED) or the like, or the metal powder such as aluminum, copper, tin, zinc or the like, and has a heat conductivity of $6.0\times10^{-4}$ cal/sec. cm. °C. Such a heat conductive material functions to accelerate the melting, softening and sublimating properties of the hot melt ink layer 3 which is applied to the back surface of the foundation 1, and can shorten the time required for melting, softening and sublimating the ink. The heat conductive material is preferably used in amounts ranging from 2 to 30 parts by weight per 100 parts by weight of the total amount of the ink. Thus, the hot-melt ink layer 3 including the heat conductive material within the above range is superior in melt-transfer property, and thereby can easily produce the duplicated image 12 merely by contacting lightly with the copy sheet 5, in addition to producing the most clear duplicated image 12.

The solid wax having a penetration of 10 to 30 at 25° C., is used as the binder material to increase the heat-sensitivity of the ink layer obtained. The solid wax is employed from waxes such as Japan wax, ceresin wax, beeswax, spermaceti or the like. Further, if necessary, other hot-melting materials such as low-molecular polyethylene, oxidized wax and ester wax may be used, together with the above waxes.

Also, as a softener, easily heat-melted material such as polyvinyl acetate, polystyrene, styrene-butadiene copolymer, cellulose ester, cellulose ether, acrylic resin, or lubricating oil is suitably used. Further, as a coloring material, conventional standard dyes or pigments used in conventional copy papers can be used without special restriction.

Preferably, 5 to 35 parts by weight of the binder material, 5 to 35 parts by weight of the softener and 5 to 25 parts by weight of the coloring material are used per 100 parts by weight of the total amount of the hot-melt ink layer 3. Thus, the ink layer 3 obtained is significantly excellent in melt-transfer property.

While the hot-melt ink layer 3 itself, according to the present invention, is softened by heating and then is melted, the ink layer 3 has the drawback that the duplicated image 12 obtained causes spreading of the ink in the perfectly melted condition. Thus, it is desirable that, when the ink layer 3 starts to soften, the ink layer 3 is transferred, and further has adhesiveness at that stage.

According to the present invention, the above hot-melt ink layer 3 is prepared so as to have a viscosity of 20 to 200 cP at 100° C., as measured on a Brookfield type viscometer. Thus, it has now been found that, when the viscosity of the ink layer 3 is less than 20 cP, the duplicated image 12 obtained causes spread of the ink, and on the contrary, when the viscosity is more than 200 cP, transferability of the ink layer 3 becomes poor.

The viscosity of the ink layer 3 at the time of the melt-transfer significantly affects the transferability of the ink layer 3. Therefore, the range of the viscosity of the ink layer 3 in the melt-transfer should be prescribed.

As a result of various investigations, it has now been found that the ink layer 3 having a vicosity within the above range at 100° C. is softened without completely melting by the heat generated from the thermal head 7, and has an excellent viscosity under a soften condition, whereby the ink layer 3 has a significantly excellent melt-transfer property.

Also, the thermal color-developing layer 2 has a thickness less than 10μ, and is prepared by dispersing both a dye precursor capable of developing the color by reacting with acid and an organic or inorganic acid being a solid or semi-solid under room temperature in a suitable binder material, and then applying the obtained homogeneous suspension onto the foundation 1 as a coating layer. In the thermal color-developing layer 2, the suspended acid which is a solid or semi-solid is melt-liquefied by Joule's heat generated from the thermal head 7, and as a result, is reacted with a dye precursor to form the clear printed image 11.

As a dye precursor, various dye precursors such as phenothiazines, fluorans, leucoauramines, triphenylmethanes, spiropyrans or the like are preferably employed. Also, as an organic or inorganic acid, benzoic acid, tartaric acid, citric acid, salicylic acid, stearic acid, gallic acid, Bisphenol A, naphtoic acid, pyrophosphoric acid, metaphosphoric acid or the like is preferably employed.

Further, the heat-sensitive transfer element of the present invention may be prepared from a commercially-available thermal paper, and in that case, the hot-melt ink layer 3 is coated on the reverse side of the color-developing surface in the thermal paper.

Also, the transfer element of the present invention may be prepared from the foundation 1 in which a coating liquid comprising waxes or synthetic resins for preventing the penetration of the ink layer 3 is penetrated in advance, or if necessary, may be prepared by interposing a layer obtained from the above liquid for preventing the penetration between the foundation 1 and the color-developing layer 2.

The function and advantages of the heat-sensitive transfer element of the invention in case of printing by the thermal printer will be described below.

Figure 2:
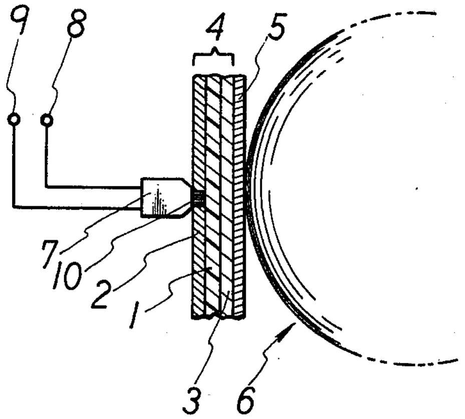
FIGS. 2 to 3 are perspective explanatory views showing a relationship between the heat-sensitive transfer element of the present invention and a copy sheet during and after printing, respectively.

FIG. 2 shows the relationship between the heat-sensitive transfer element of the invention and the copy sheet in the course of printing. In FIG. 2, indicated as 4 is the heat-sensitive transfer element of the invention, comprising the foundation 1, the thermal color-developing surface 2 and the hot-melting ink layer 3, 5 is the copy sheet, 6 is the platen, 7 is the thermal head in which the exothermic resistance element is arranged in the form of the dot matrix such as $1\times7$, $5\times7$, $7\times9$ or the like, due to the printing pattern, 8 and 9 are terminals for impressing the pulse, and 10 is the printed image which is just forming.

The heat-sensitive transfer element 4 is attached to the thermal printer so that the hot melt ink layer 3 side is in contact with the copy sheet 5. The color-developing layer 2 is in contact with the thermal head 7, while the copy sheet 5 is in contact with the platen 6. As a copy sheet 5, a conventional paper is employed. When the pulse corresponding to the printing pattern is impressed from the terminals 8 and 9, the thermal head 7 generates Joule's heat from the dots corresponding to the printing pattern. The Joule's heat generated is transmitted to the thermal color-developing layer 2, and melts the organic or inorganic acid, which is solid or semi-solid, and which is dispersed in the thermal color-developing layer 2, to make the melted acid react with the dye precursor, whereby the printed image 10 corresponding to the printing pattern is formed. Furthermore, Joule's heat is instantaneously transmitted through the foundation 1 to the hot-melt ink layer 3, and partially melts the ink layer 3 corresponding to the printing pattern.

Figure 3:
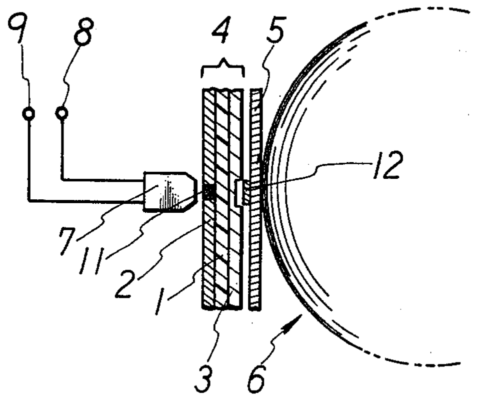

FIG. 3 shows a condition after impressing the pulse, and numerals of 1 to 9 indicate the same materials as the numerals of 1 to 9 in FIG. 2. 11 is a printed image formed perfectly, and 12 is a duplicated image.

After impressing the pulse, the thermal head 7, the heat-sensitive transfer element 4 and the copy sheet 5 are separated, and a part of the hot-melt ink layer 3 melted in compliance with the printing pattern is released from the foundation 1, and transferred to the copy sheet 5, whereby the duplicated image 12 corresponding to the printing pattern is formed.

On the other hand, in the thermal color-developing layer 2, the color-development reaction between the dye precursor and the organic or inorganic acid has already been accomplished, and as a result, the clear printed image 11 has been formed.

Thus, the pulse impression is repeated, and the printing procedures are successively carried out.

Further, FIGS. 2 to 3 show the embodiment of the case that the heat-sensitive transfer element 4 is placed on the copy sheet 5 to produce the duplicated image 12. To the contrary, if the copy sheet 5 has excellent heat conductivity, it is possible that the copy sheet 5 is placed on the heat-sensitive transfer element, and is contacted with the thermal head 7 at the back surface thereof.

The printed image 11 thus obtained has a sharp profile, and can be read with ease.

Also, with respect to the duplicated image 11, since the melt-transfer property of the hot-melt ink layer 3 is increased by the function of the heat-conductive material, and has a coating weight of 1 to 15 g./cm.$^2$ allowing an excellent melt-transfer property as mentioned above, the duplicated image 11 is formed on the copy sheet 5 with ease, and since the amount of the transferring ink is suitable, the clear duplicated image 12 obtained by transferring the solid hot-melt ink is highly durable and difficult to alter. Accordingly, such a duplicated image 12 is particularly effective in case requiring storage over a long period of time.

Furthermore, according to the present invention, since the back surface of the foundation 1 has excellent smoothness and heat conductivity, and further the organic or inorganic acid in the color-developing layer 2 and both the binder material and the softener in the hot-melt ink layer 3 have excellent melting velocity, both the printed image 11 and the duplicated image 12 with sufficient clarity can be conventionally formed by the thermal pulse of about 6/1000 seconds (13 wt./mm.$^2$). Accordingly, the heat-sensitive transfer element 4 of the invention can be used at a high printing speed of about 60 characters per second, and can duplicate the clear duplicated image 12 with ease at about 2 times the printing speed in the case of using two sheets of conventional thermal paper, due to the excellent melt-transfer property thereof, and therefore is preferably used as a transfer element in the thermal printing device such as a thermal printer or the like, requiring a high printing speed.

What we claim is:

1. A heat-sensitive transfer element comprising a foundation having a thickness of 20 to 60$\mu$, density of 0.75 to 1.3 g/cm$^3$ and in which the back surface has a Bekk smoothness of 60 to 20000 seconds, a thermal color-developing layer provided on the front surface of said foundation, and a hot-melt ink layer having a coating weight of 1 to 15 g/m$^2$ and a heat conductivity of $4\times10^{-4}$ to $15\times10^{-4}$ cal./sec. cm. °C. provided on the back surface; the hot-melt ink layer including a heat-conductive material powder which has a heat conductivity of $6.0\times10^{-4}$ to $25.0\times10^{-4}$ cal./sec. cm. °C., and a solid wax which has a penetration of 10 to 30 at 25° C. as a binder material, and having a viscosity of 20 to 200 cP at 100° C.

2. The transfer element of claim 1, wherein said back surface of the foundation has a Bekk smoothness of 200 to 16000 seconds.

3. The transfer element of claim 1, wherein said foundation is a paper having a thickness of 30 to 50$\mu$ and a density of 0.8 to 1.2 g./cm.$^3$.

4. The transfer element of claim 1, wherein said hot-melt ink layer has a heat conductivity of $5\times10^{-4}$ to $9\times10^{-4}$ cal./cm. sec. °C.

5. The transfer element of claim 1, wherein said thermal color-developing layer is a coating layer prepared by dispersing dye precursor and an acid which is solid or semi-solid in a binder material, and has a thickness less than about 10$\mu$.

6. The transfer element of claim 1 or 5, wherein said hot-melt ink layer further includes a coloring material and a softener, and has a coating weight of about 3 to 10 g./m.$^2$.

7. The transfer element of claim 6, wherein 2 to 30 parts by weight of said heat-conductive material, 5 to 25 parts by weight of the coloring material, 5 to 85 parts by weight of the binder material and 5 to 35 parts by weight of the softener are used per 100 parts by weight of the total amount of the hot-melt ink layer.

* * * * *